No. 800,659. PATENTED OCT. 3, 1905.
E. H. KORSMEYER.
GAS OR GASOLENE ENGINE.
APPLICATION FILED JULY 20, 1903.
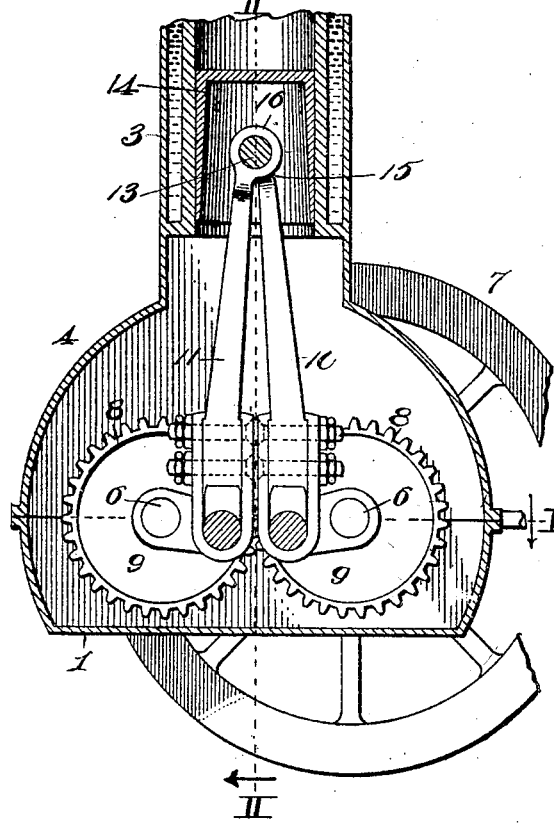
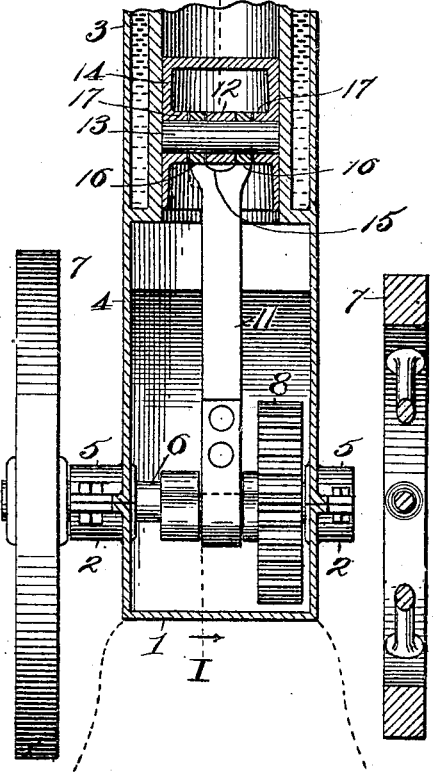
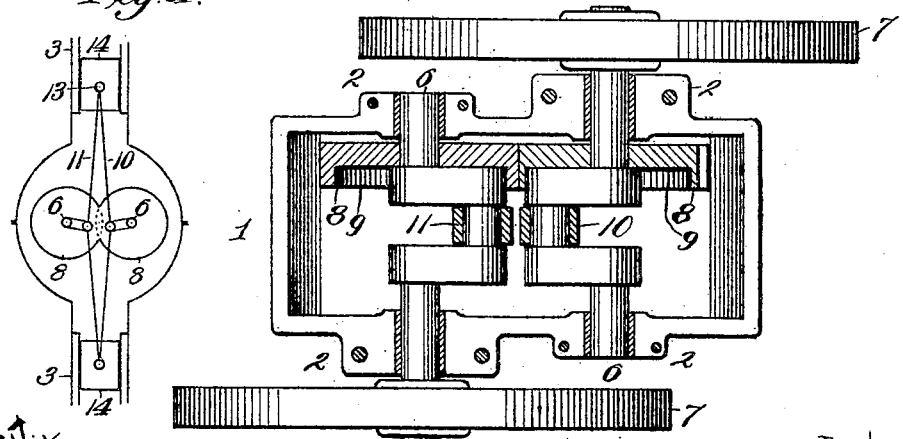
Witnesses:
A. McArthur
H. C. Rodgers
Inventor:
E. H. Korsmeyer.
By George A. Thorpe
Atty.

UNITED STATES PATENT OFFICE.

ERNEST H. KORSMEYER, OF ROSEDALE, KANSAS.

GAS OR GASOLENE ENGINE.

No 800,659.           Specification of Letters Patent.          Patented Oct. 3, 1905.

Application filed July 20, 1903. Serial No. 166,274.

*To all whom it may concern:*

Be it known that I, ERNEST H. KORSMEYER, a citizen of the United States, residing at Rosedale, in the county of Wyandotte and State of Kansas, have invented certain new and useful Improvements in Gas or Gasolene Engines, of which the following is a specification.

My invention relates to improvements in explosive-engines; and my object is to provide an engine in which the shock or jar incidental to the explosion is so largely eliminated or so evenly distributed that little or no vibration shall be communicated to the vehicle or other structure upon which the engine is mounted. An engine possessing this feature of advantage will be found of special service as a motor for an automobile or similar vehicle, the great objection to the explosive-engines as now constructed residing in the fact that they impart such decided vibration to the vehicle.

With the object in view, therefore, of producing an explosive-engine possessing the advantages mentioned the invention consists in certain novel and peculiar features of construction and combinations of parts. as hereinafter described and claimed, and in order that it may be fully understood reference is to be had to the accompanying drawings, in which—

Figure 1 is a vertical section taken on the line I I of Fig. 2. Fig. 2 is a section taken on the line II II of Fig. 1. Fig. 3 is a horizontal section taken on the dotted line III of Fig. 1, but with the crank-shafts and fly-wheels shown in elevation. Fig. 4 is a diagrammatic view showing the engine as equipped with two pistons arranged tandem.

In the said drawings, 1 designates the lower portion or frame, the same being adapted to be mounted upon any suitable base or foundation and provided at opposite sides with offsets forming the lower halves 2 of two sets of bearings.

3 designates the upper part of the engine, shown in this case as of the vertical type and having its portion 4 resting upon the lower portion 1 and provided with the upper halves 5 of the bearings referred to.

6 designates parallel crank-shafts journaled in the bearings mentioned and provided at opposite sides of the frame with fly-wheels 7. These shafts within the frame are provided with gear-wheels 8, meshing together so as to insure synchronism of movement of said shafts, and in order that the engine shall be as compact as possible the inner faces of the gear-wheels are recessed, as at 9, to receive and accommodate the contiguous ends of the cranks of the shafts, as shown most clearly in Fig. 3.

10 and 11 designate pitmen mounted on the cranks in the manner shown or in any other suitable or preferred manner, pitman 10 terminating at its upper end in an eye 12, pivotally engaging midway its length the cross-pin 13 of piston 14. The upper end of pitman 11 is bifurcated, as at 15, to form a pair of eyes 16 to fit pivotally on the cross-pin at opposite sides of eye 12 and snugly between the latter and the inwardly-projecting bosses 17 of the piston. By thus connecting the pitmen with the cross-pin of the piston the tendency is to reciprocate the former in a straight line and without any lateral twisting whatever, and by gearing the two similar and parallel crank-shafts together a synchronous movement thereof at a uniform speed is produced.

One crank-shaft and its fly-wheel counterbalances the other, so as to practically eliminate the shock or jar incident to the explosion, the shock or jar being, in effect, wholly absorbed by the metallic frame of the engine.

The usual valve-operating devices (not shown) are adapted to be mounted upon the crank-shafts within the frame at the opposite ends of the cranks from said gear-wheels, which devices being of any suitable or preferred construction and having no bearing on the present invention are omitted.

It will be observed that the upper casing 3 forms a portion of the water-jacket 18, surrounding the cylinder 19, the casing 3 4 and the cylinder 19 being formed integral with one another, and it will also be noted that the lower casing 1 is secured to the lower portion 4 of the upper casing, so as to wholly inclose the gearing and make it practically dust-proof, which is a great advantage when my construction is applied to motor-vehicles.

From the above description it will be apparent that I have produced an explosive-engine which possesses the features of advantage enumerated as desirable in the statement of invention and which may obviously be modified in minor particulars without departing from the essential spirit and scope or sacrificing any of its advantages.

Having thus described the invention, what I claim as new, and desire to secure by Letters Patent, is—

1. In a motor, the combination with a cylinder and a piston therein, of a casing secured thereto and provided with an open end half-journals located at the open end of the casing, a second casing, half-journals located on the second casing and adapted to register with the journals at the open end of the first-named casing, the last-named casing secured to and closing the open end of the first-named casing, shafts received in the journals formed by the juncture of the casings, gearings secured upon the shaft within the casings and means connecting the piston and gearing to actuate the former.

2. In a motor, the combination with a cylinder and piston, of a sectional casing connected therewith, crank-shafts journaled in the casing, fly-wheels secured to the outer ends of the shafts, intermeshing gearing secured to the shafts within the casing, the side faces of the gears being recessed for the reception of the adjacent cranks and pitmen connecting the cranks and piston.

3. In an explosive-engine, the combination with a suitable frame and a cylinder rigidly carried thereon, of a reciprocating piston in the cylinder, a pair of parallel shafts journaled in the frame in a plane at right angles to the longitudinal axis of the cylinder and disposed on opposite sides of and at equal distances from the longitudinal axis of the cylinder, the shafts extending across the frame and each having a plurality of bearings in the frame, cranks on the shafts in longitudinal alinement with the cylinder and out of longitudinal alinement with each other, and a pair of pitmen, one end of each of which is pivotally secured to each of the cranks, and the opposite ends of each of the pitmen secured to a common point in the piston.

4. In an explosive-engine, the combination with a suitable frame and a cylinder rigidly carried thereon, of a reciprocating piston in the cylinder, a pair of parallel shafts journaled in the frame in a plane at right angles to the longitudinal axis of the cylinder and disposed on opposite sides of and at equal distances from the longitudinal axis of the cylinder, the shafts extending across the frame and each having a plurality of bearings in the frame, cranks on the shafts in longitudinal alinement with the cylinder and out of longitudinal alinement with each other, a pair of pitmen, one end of each of which is pivoted to each of the cranks and both being pivotally connected to a common point in the piston, and a fly-wheel secured to each shaft on opposite sides of the cranks thereof.

5. The combination with a frame, a cylinder carried thereon and a piston moving in the cylinder, of a pair of parallel shafts passing across the frame and journaled in each side thereof, a fly-wheel secured to one end of one of the shafts, a second fly-wheel secured to the opposite end of the remaining shaft, cranks formed on the shafts, a gear-wheel located on each of the shafts and intermeshing with each other, the gear-wheel on one shaft lying adjacent the fly-wheel of said shaft, the remaining gear-wheel lying opposite and at a greater distance from the fly-wheel on its shaft, pitmen, the outer ends of which are pivotally connected with the cranks, the pitmen converging until their inner ends meet and are secured at a common point within the piston.

In testimony whereof I affix my signature in the presence of two witnesses.

ERNEST H. KORSMEYER.

Witnesses:
H. C. RODGERS,
G. Y. THORPE.